US006952210B1

(12) United States Patent
Renner et al.

(10) Patent No.: US 6,952,210 B1
(45) Date of Patent: ***Oct. 4, 2005

(54) METHOD OF GENERATING MULTIPLE MASTER TYPEFACES CONTAINING KANJI CHARACTERS

(75) Inventors: John S. Renner, Atherton, CA (US); Jonathan von Zelowitz, San Francisco, CA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,976

(22) Filed: Dec. 5, 1997

(51) Int. Cl.$^7$ .............................................. G06T 17/00
(52) U.S. Cl. ..................................................... 345/471
(58) Field of Search ............................... 345/468, 472, 345/471

(56) References Cited

U.S. PATENT DOCUMENTS

| | | | |
|---|---|---|---|
| 4,933,866 A | 6/1990 | Markoff et al. ............. | 364/518 |
| 5,042,075 A | * 8/1991 | Sato ............................ | 382/47 |
| 5,185,818 A | 2/1993 | Warnock ..................... | 382/54 |
| 5,251,293 A | 10/1993 | Takatoshi et al. | |
| 5,301,267 A | 4/1994 | Hassett et al. ............. | 395/150 |
| 5,319,358 A | 6/1994 | Martinez et al. ............ | 345/141 |
| 5,398,306 A | 3/1995 | Karow ........................ | 395/110 |
| 5,468,077 A | 11/1995 | Motokado et al. | |
| 5,586,241 A | 12/1996 | Bauermeister et al. | |

FOREIGN PATENT DOCUMENTS

EP 0 283 533 B1 3/1987
EP 0 701 242 A2 3/1996

OTHER PUBLICATIONS

Sugita, T. et. al: "Multi–Font Kanji Generator," The Transaction of the IECE of Japan, vol. E66, No. 6, Jun. 1, 1983, pp. 337–382, XP000955315.
Adobe Type 1 Multiple Master Typefaces: An Overview of Advances in Type and technology from Adobe Systems Incorporated, Adobe Systems Inc., pp. 1–9.
Ikarus: computergesteuerte Vorlagenerstellung fur Foto, CRT –und Lasersatz (English sumamry).
Karow, Peter, "Font Technology Mehods and Tools," URW software & Type GmbH, Springer–Verlag 1994, pp.V and 105–149.
Boag, A., "Fonts: A surgery of current issues," Dektop Publishing Commentary, Jun. 1994, pp.6–9.
Haralambous, Y., "Parametrization of PostScript fonts through METAFONT–an alternative to Adobe Multiple MasterFonts," Electronic Publishing, vol. 6, pp.145–157, Sep. 1993.
McQueen, III et al., "Infinifont: a parametric font generation system," Electronic Publishing, vol. 6, pp. 117–132, Sep. 1993.

* cited by examiner

*Primary Examiner*—Mark Zimmerman
(74) *Attorney, Agent, or Firm*—Fish & Richardson P.C.

(57) ABSTRACT

A multiple master typeface can generate and display kanji characters. The graphical elements of the characters in the typeface are classified into shape types, and a glyph set is provided for each shape type. Each glyph set contains base glyphs which represent the variations in the shape type. To generate the character, the shape type of and position of each element in the character is identified. For each element in the character, a weighting factor is determined for each base glyph in the glyph set for the shape type of that element. A composite element is created from the base glyphs in the glyph set for the shape type of that element. The relative contribution of each base glyph to the composite element is determined by the weighting factors determined for that element and that base glyph. To display the character, the composite elements are placed in the identified positions. An instance of a character may be generated from the master characters by interpolating between the master characters on an element by element basis.

36 Claims, 7 Drawing Sheets

METHOD OF GENERATING MULTIPLE MASTER TYPEFACES CONTAINING KANJI CHARACTERS

BACKGROUND

The present invention relates to a method of, generating characters, and more particularly to a method of generating multiple master typefaces containing kanji characters.

A set of characters with a particular design is called a "typeface". Digital typefaces, such as the Postscript® products available from Adobe Systems Incorporated in San Jose, Calif., generally include instructions for rendering characters in a particular font. The term "font" refers to an instance of a typeface, e.g., a particular weight and point size. The term "character" refers to any form of letter, number, symbol, ideograph or the like.

Although many typefaces have been developed for phonetic alphabets, far fewer typefaces have been developed for ideographic writing systems. In most ideographic writing systems, the number of characters is exceptionally large, the form of each character is different, and the characters are structurally complex. The most common ideographic characters currently in use are kanji characters. Kanji characters are currently used in China, Japan, Korea, Vietnam and Malaysia. In contrast to phonetic alphabets, which typically contain less than 100 characters (including upper and lower case variants of the same letter), there are several thousand kanji characters. In addition, in contrast to phonetic alphabets in which most characters contain only two or three strokes, the two thousand most-used kanji characters contain an average of about eleven strokes each, and some characters contain sixty or more strokes.

Given the huge number of characters and their complexity, the development of a kanji typeface, i.e., a typeface containing at least the commonly used kanji characters, is a long and arduous process.

One conventional method of generating kanji characters requires a set of line components each having a pre-defined size and orientation. Each kanji character is generated by placing pre-defined line components in pre-defined positions. Unfortunately, this method is limited to the creation of characters composed of the specific line components. Thus, the typeface is limited to a single font.

A more recent method of generating kanji characters is to use a multiple master typeface. Prior to the development of multiple master typefaces, a typeface (whether for kanji or phonetic alphabets) typically included only several discrete fonts, such as regular, semi-bold, and bold. Users were limited to the choices available, or they had to use artificial techniques for bolding, lightening, expanding or compressing an existing font. Unfortunately, such artificial techniques often resulted in the unintentional creation of characters with anomalous or unaesthetic features.

A multiple master typeface allows the user to create a myriad of fonts by setting font design variables which define font properties such as width, weight and size. The user can generate a font by interpolating between various master fonts. The font design variables are used to determine the relative weights of the master characters in each composite character. Multiple master typefaces have been described (for phonetic alphabets) in U.S. Pat. No. 4,933,866, which is incorporated herein by reference.

Unfortunately, although multiple master typefaces permit the user to create kanji characters in variety of fonts, the creation of a kanji typeface remains a long and arduous process for the font developer. In fact, the problem is only compounded for multiple master typefaces because an entire font must be generated for each master font.

SUMMARY

In one aspect, the invention is directed to a method of displaying a master of a digital font character. A shape type and a position are identified for each element in the character. A glyph set is provided for each shape type, and each glyph set contains a plurality of different base glyphs. For each element in the character, a weighting factor is determined for each base glyph in the glyph set for the shape type of that element, and a composite element is created from the base glyphs in the glyph set for the shape type of that element. A relative contribution of each base glyph to the composite element is determined by the weighting factors determined for that element and that base glyph. The composite elements are placed in the identified positions to display the character.

Implementations of the invention may include the following. Creating the composite character may include interpolation between or extrapolation from the base glyphs in the glyph set based upon the weighting factors. At least one weighting factor may be derived from a weighting value which is assigned to a subset of the base glyphs in the glyph set, and a plurality of weighting factors may be derived from at least one design axis variable. The character may be a kanji character.

In another aspect, the invention is directed to a method of defining a master of a digital font. A shape type and a position are identified for each element in a character. A glyph set is provided for each shape type, each glyph set containing a plurality of different base glyphs. For each element in the character, at least one weighting factor is determined which represents the relative contribution to a composite element of at least one of the base glyphs in the glyph set for the shape type of that element. The shape type, position, and weighting factor for each element of the character are stored in non-volatile storage. These steps are iterated for each character in the master font.

Implementations of the invention may include the following. The steps may be iterated for each master font in a multiple master typeface. A weighting factor may be determined for each base glyph in the glyph set for each element. The weighting factor may represent the relative contribution of two or more of the base glyphs to the composite element.

In another aspect, the invention is directed to a method of displaying an instance of a digital font character. A first composite element is generated from a first plurality of base glyphs for each element of a first master character, and a second composite element is generated from a second plurality of base glyphs for each element of a second master character. The first and second master characters are combined to generate the instance of the character.

Implementations of the invention may include the following. The first and second pluralities of base glyphs may be selected from the same glyph set. Generating each first composite element may include defining a first plurality of weighting factors for each base glyph in the glyph set, and generating each second composite element may include defining a second plurality of weighting factors for each base glyph in the glyph set. Creating the composite character may include calculating a new weighting factor for each base glyph in the glyph set from the weighting factors for that base glyph from the first and second pluralities of weighting factors.

In another aspect, the invention is directed to a method of displaying a digital font character. A shape type and a position are identified for each element in the character. A glyph set is provided for each shape type, and each glyph set containing a plurality of different base glyphs. For each element in the character, the following steps are performed: a first weighting factor is received for each base glyph in the glyph set for the shape type of that element, a second weighting factor is received for each base glyph in the glyph set for the shape type of that element, and a third weighting factor is determined for each base glyph in the glyph set for the shape type of that element. The third weighting factor is computed from the first and second weighting factors. Then, for each element in the character, a composite element is created from the base glyphs in the glyph set for the shape type of that element. The relative contribution of each base glyph to the composite element is determined by the third weighting factor determined for that element. The composite elements are placed in the identified positions to display the master of the character.

Implementations may include the following. The third weighting factor may be a weighted average of the first and second weighting factors. The weighted average may be determined by a font design variable.

Advantages of the invention include the following. A typeface containing kanji characters may be generated quickly and easily.

DETAILED DESCRIPTION

Figure 1:
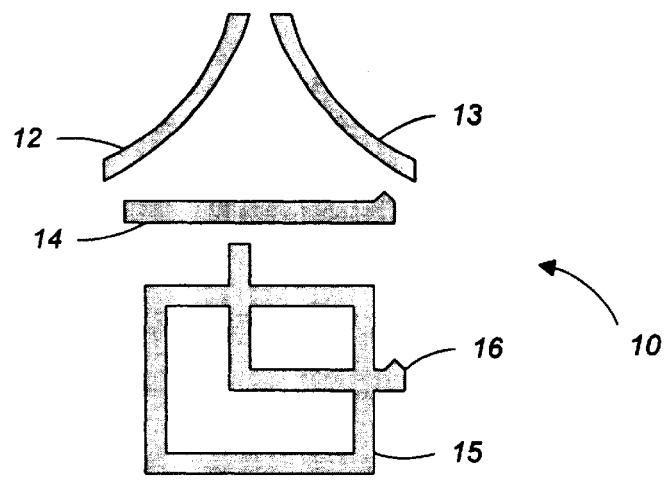
FIG. 1 is a schematic illustration of a fanciful kanji character.

A character is composed of a finite, although potentially large, number of graphic elements, some of which may overlap. For example, referring to FIG. 1, a kanji character 10 (actually a fanciful character for the purpose of this discussion) contains two diagonal slashes 12 and 13, a horizontal line 14, a rectangle 15 and a hook-shaped element 16. Other graphic elements, such as vertical strokes, dots, and more complex elements, may be used to generate other kanji characters. In general, the graphic elements appearing in kanji characters may be classified into approximately one hundred shapes. The vast majority of kanji characters may be generated from these shapes. Of course, although each element in the illustrated kanji character 10 has a different shape, some kanji characters contain multiple elements with the same shape.

Each element may consist of one or more strokes. For example, the horizontal line 14 in the kanji character 10 is a single stroke, whereas the rectangle 15 below the horizontal line 14 may be composed of four strokes. The hook-shaped element 16, which may be drawn either with a single stroke or with two strokes, will be used as an exemplary element from the kanji character 10 in the discussion below.

Figure 3:
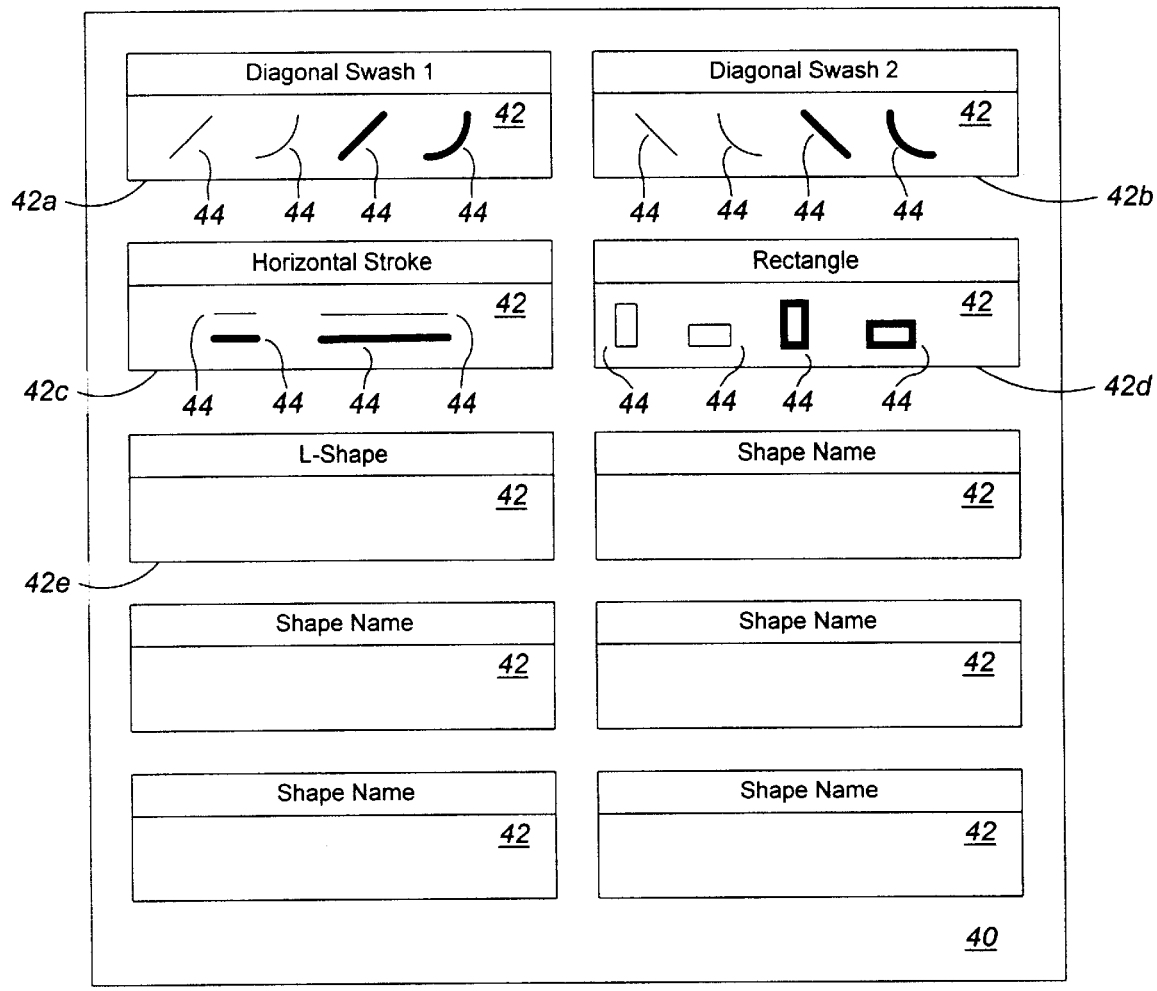
FIG. 3 is a schematic diagram of a glyph library used in the methods of FIGS. 2A and 2B.

Referring to FIG. 3, the method uses a glyph library 40 which permits the generation of kanji characters in a myriad of fonts. The glyph library 40 includes a glyph set 42 for each shape which is expected to appear in the kanji typeface. The glyph library 40 may contain about 100 glyph sets 42, e.g., 130 glyph sets, although more or fewer glyph sets may used in the glyph library 40. Specifically, the glyph library 40 will contain a glyph set 42a for the diagonal slashes such as element 12, a glyph set 42b for diagonal slashes such as element 13, a glyph set 42c for horizontal lines such as element 14, a glyph set 42d for rectangles such as element 15, and a glyph set 42e for hook-shaped elements such as element 16. Each glyph set 42 contains one or more base glyphs 44. The various base glyphs 44 identify the extreme variations that are available for the element. For example, an element might vary in curvature, height, width, weight and tapering. Two to thirty-two base glyphs should provide a sufficient range of variations, although there could be just one or more than thirty-two base glyphs in a glyph set. In brief, the relationship of base glyphs to elements is similar to the relationship of masters to characters; an individual instance of a character may be constructed by compositing the masters, whereas an individual instance of an element may be constructed by compositing the base glyphs.

Figure 4:
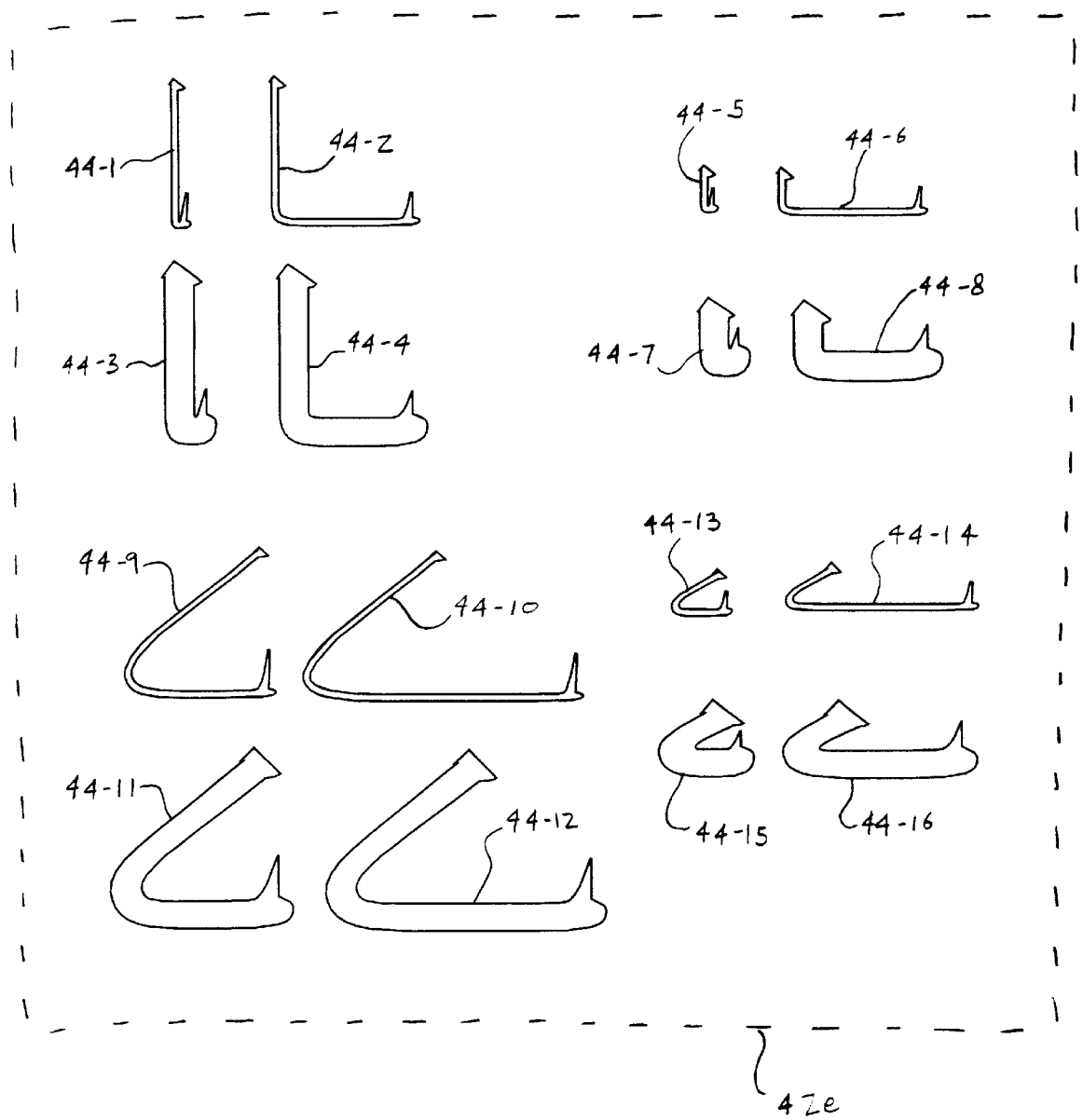
FIG. 4 is a schematic illustration of a glyph set from the glyph library of FIG. 3.

Referring to FIG. 4, the glyph set 42e contains base glyphs 44-1, 44-2, 44-3, . . . , 44-16 corresponding to the possible variations of the hook-shaped element 16. For example, base glyph 44-9 is highly curved whereas base glyph 44-2 is right-angled, and base glyph 44-3 is thick whereas base glyph 44-4 is thin.

The classification of the shapes that are used in kanji characters and the creation of the base glyphs for each shape may be performed by a font element developer in conjunction with a programmer prior to distribution of software for generation of multiple master typefaces. Once the glyph library has been created, the font designer may begin creating master fonts.

Figure 2A:
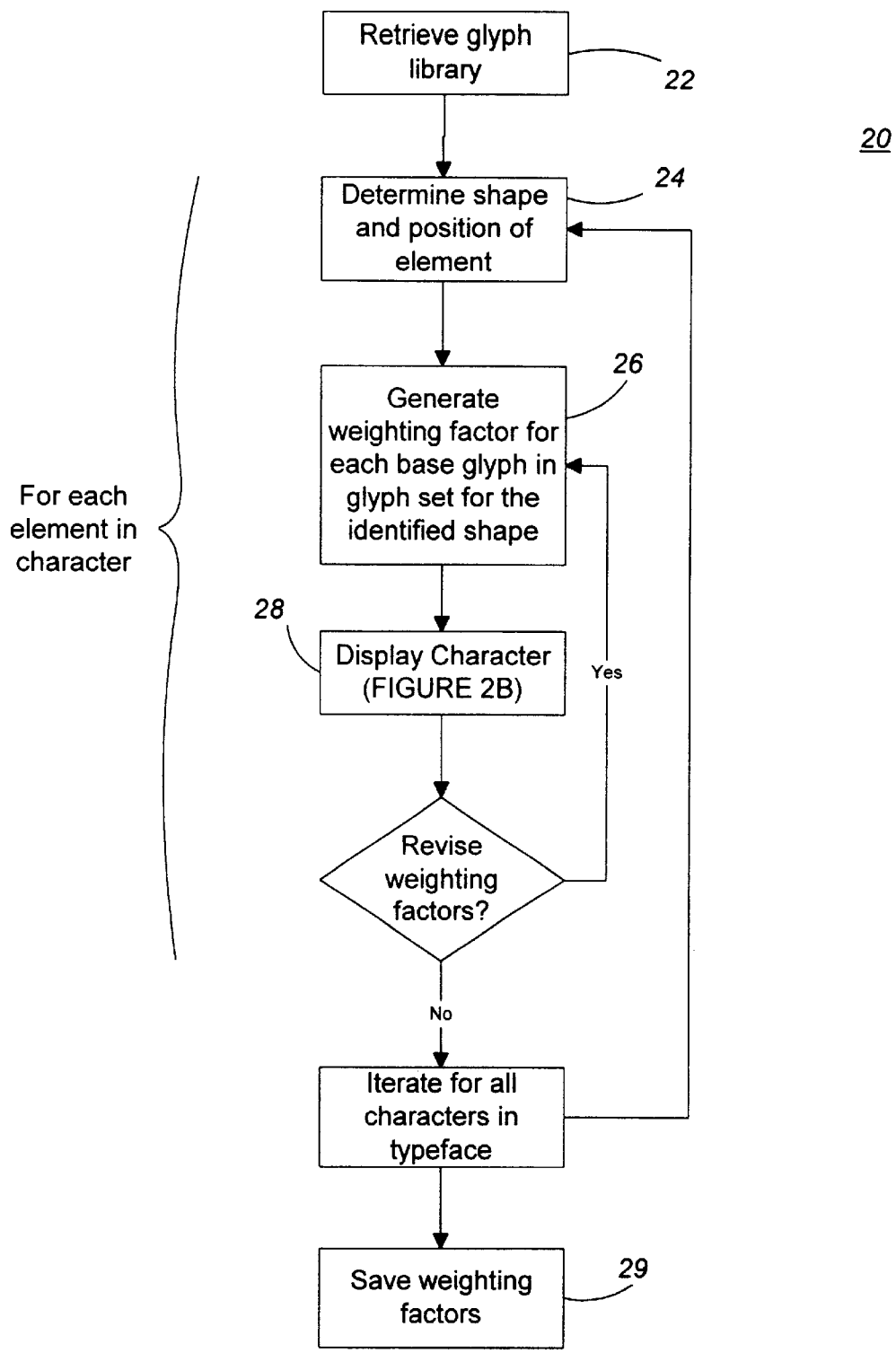
FIG. 2A is a flow diagram of a method of generating a character according to the present invention.

Referring to FIG. 2A, a computer implemented method 20 of generating a master font containing kanji characters will be described. The method begins with the retrieval of the glyph library into the memory of a computer (step 22). As previously noted, the glyph library contains a set of base glyphs for each of the approximately one-hundred shapes in the typeface. Then the font designer determines the shape and position of an element in a particular character (step 24). Default values for this shape and position of the elements may be created by the font element developer at the same time that the base glyphs are created. Alternately, the font designer may select a shape from a menu or palette and then drag the shape into position.

Once the shape and position of the element has been determined, a set of weighting factors is generated for the element (step 26). Each weighting factor is associated with one of the base glyphs for the identified shape of the element. For example, the hook-shaped element 16 may have sixteen weighting factors $a_1, a_2, a_3, \ldots, a_{16}$ corresponding to the sixteen base glyphs 44-1, 44-2, 44-3, . . . , 44-16. The weighting factors will be used, as described below, in the generation of the character. In brief, the weighting factor represents the influence of each base glyph relative to the other base glyphs in the composite element. The weighting factors may be normalized so that the total of the weighting factors for each element is equal to 100 percent.

The steps of determining the shape, position of the element and generating weighting factors are performed for each element in the character. As each element in a particular character is assigned weighting factors, the character may be displayed and viewed by the font designer (step 28), and the weighting factors may be revised. Once the final values of the weighting factors are selected for the character, they are stored in a non-volatile memory with the identified position and shape to create a data structure 54 (see FIG. 5) representing the master character (step 29). These steps are iterated for each character in a particular master font. The method may end at this point with a data structure 52 (see FIG. 5) which stores a master font. In addition, the steps may be iterated for each master font, in which case the method may end with a data structure 50 (see FIG. 5) which stores a completed multiple master typeface.

Figure 2B:
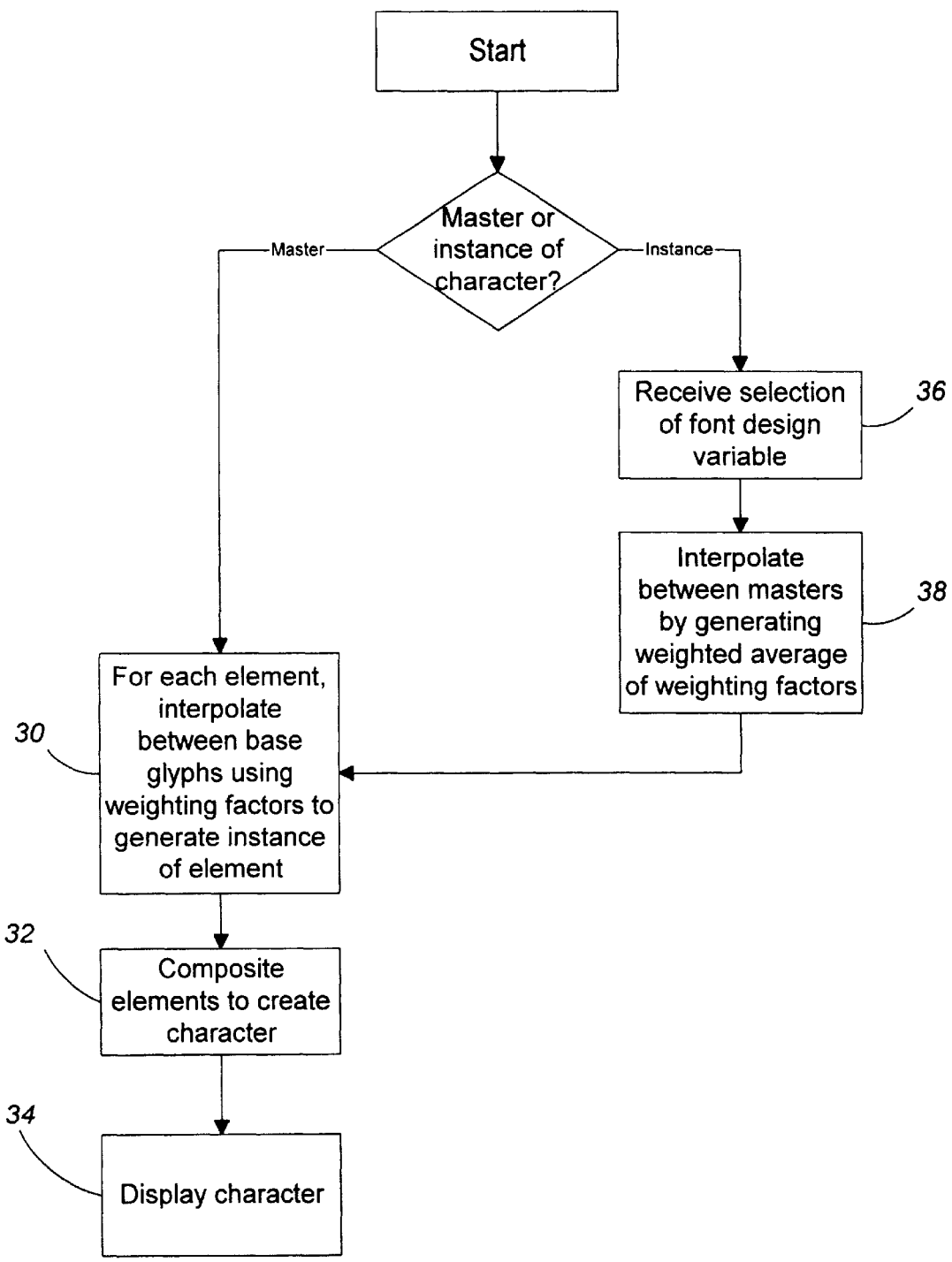
FIG. 2B is a flow diagram of a method of displaying a character according to the present invention.

Referring to FIG. 2B, to display a character (either a master or an instance of a character interpolated from master characters) the base glyphs in the glyph set are combined to generate a composite element for each individual element in the character (step 30). For example, hook-shaped element 16 is formed as a composite of the base glyphs 44-1, 44-2, . . . , 44-16. The combination is performed using the selected weighting factors to determine the relative contribution of the base glyphs to the composite element. The various composite elements are overlaid to generate the character (step 32) and the character is displayed (step 34).

If an instance of a character is to be generated by interpolating between two masters, several additional steps are performed. First, the user sets a font design variable to define a font property (step 36). The font design variable indicates the relative contribution of the masters to the instance of the character. The font design variable may be considered the distance along the design-axis between the two master fonts. The computer interpolates between the masters (step 38). The interpolation between the master fonts may be performed on an element-by-element basis. Specifically, a new set of weighting factors for a new character may be generated by averaging the weighting factors of the master characters. The weighting of the average is controlled by the font design variables. The new weighting factors are used in step 30.

Figure 5:
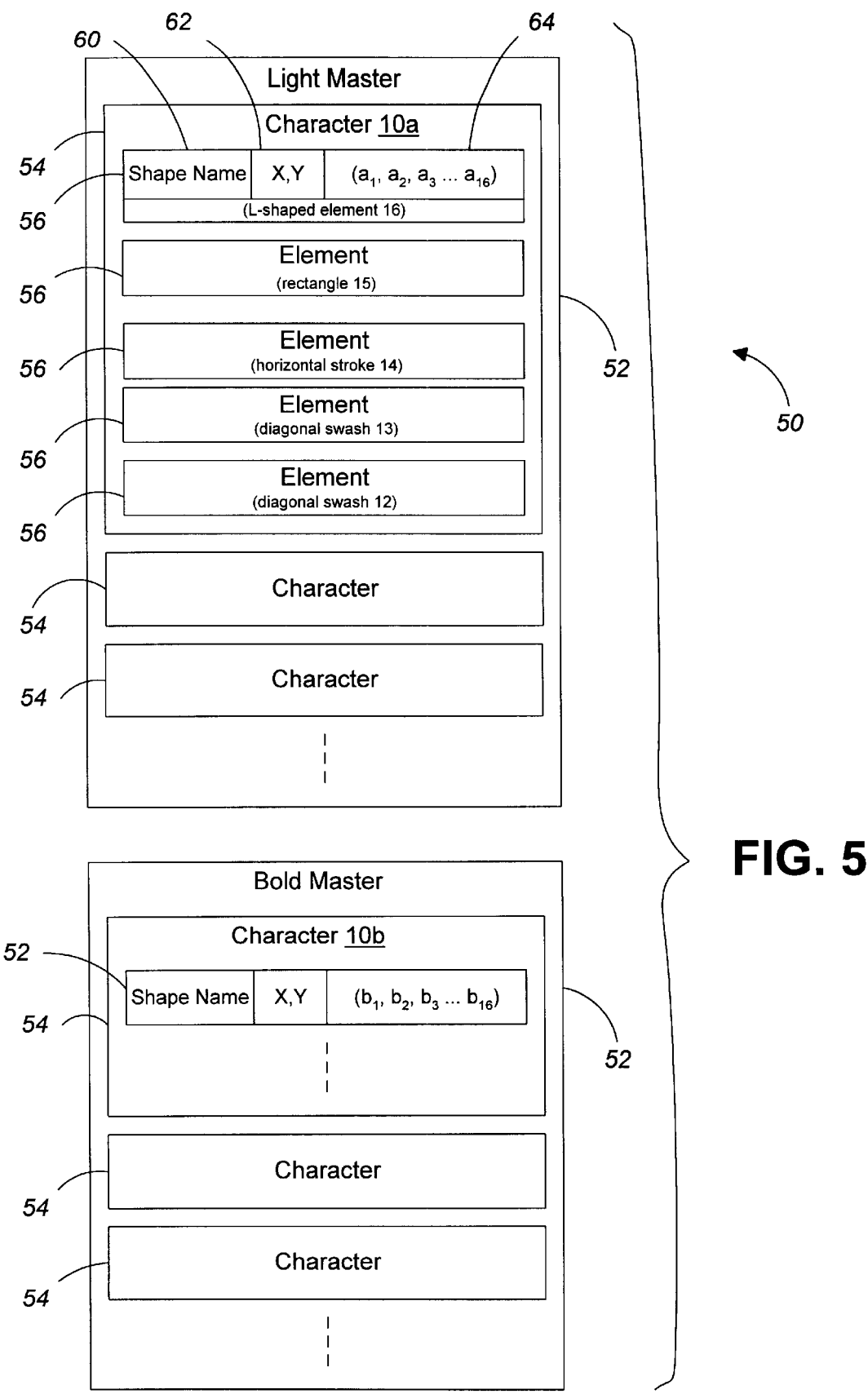
FIG. 5 is a schematic illustration of a data structure representing a multiple master typeface.

Referring to FIG. 5, the digital typeface 50 may include a plurality of master fonts 52, e.g., a light font and a bold font. Each master font 52 includes a master character 54 for each character, and each master character 54 includes an entry 56 for each element in that character. Each entry 56 includes a shape name 60 for the element, which acts as a reference to the appropriate glyph set in the glyph library. Each entry also includes the position 62 of the element in the character (typically in x-y coordinates), and the weighting factors 64 for that element in that position.

Figure 6:
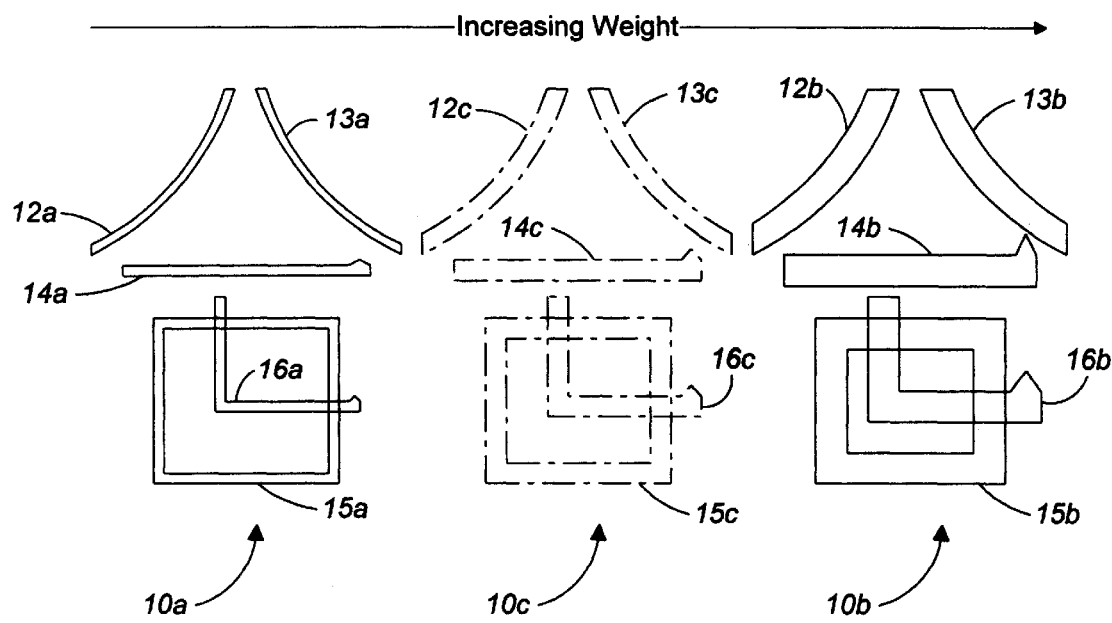
FIG. 6 is a schematic illustration of a kanji characters generated and displayed in a variety of fonts according to the methods of FIGS. 2A and 2B.

Referring to FIG. 6, the elements have been composited to display the light and bold master characters 10*a* and 10*b* for the light and bold master fonts, respectively. For example, referring to FIGS. 5 and 6, for the hook-shaped element 16*a* in the light character 10*a* of the light master font, there is one weighting factor ($a_1, a_2, a_3 \ldots a_{16}$) for each base glyph (44-1, 44-2, 44-3 . . . 44-16) in the glyph set 42*e* (see FIG. 4). Similarly, for the hook-shaped element 16*b* in the bold character 10*b* of the bold master font, there is one weighting factor $b_1, b_2, b_3 \ldots b_{16}$ for each base glyph. When designing a new master, the font designer may manipulate the x and y position of the element and the weighting factors in order to obtain an element that is esthetically pleasing in relationship to the other elements in the character and in the master font.

The weighting factors may be expressed in a variety of formats. For example, as shown in FIG. 5, there may be one weighting factor for each base glyph. Alternately, the relationship between the base glyphs may be considered to be a multi-dimensional glyph array in which the different glyphs are located at the endpoints of the design axes. In this case, the weighting factors may be stored as font design variables. For example, the sixteen base glyphs 44-1, 44-2, . . . , 44-16 of the glyph set 42*e* may define four design axes corresponding to the weight, curvature, height and width of the hook-shaped element. Known transformations may be used to convert the font design variables into weighting factors.

It is also possible to assign weights to glyph subsets within the glyph set. For example, a weighting value can be assigned to a pair of base glyphs. This weighting value represents the transitional shape value between the two base glyphs. For example, one glyph pair may match a bold base glyph with a light base glyph, whereas another glyph pair may match a narrow base glyph with a wide base glyph. Weighting values can be assigned to the glyph pairs so that the result would be an interpolated glyph of an intermediate shape. The weighting factors for the individual base glyphs can be derived from the weighting values that have been assigned to the glyph pairs.

In order to display the character, an instance of each individual element in the kanji character 10 is generated. Specifically, a composite element is generated by interpolating between the base glyphs in the glyph set according to the assigned weighting factors. For example, in the light character 10*a*, the L-shaped element 16*a* will be a composite of the base glyphs 44-1, 44-22, . . . 44-16, with the contribution of each base glyph determined by the weighting factors $a_1, a_2, a_3 \ldots a_{16}$, respectively. A conventional interpolation procedure, such as image morphing, may be performed to generate a composite element from the base glyphs. Then each composite element is placed at the position 62 identified in the entry 56. The elements are overlaid and a simple outline may be generated and filled to display the character.

Alternately, the instance of the element may be generated by extrapolation. Interpolation and extrapolation are transformationally equivalent mathematical procedures; extrapolation may be considered a case in which a negative one of the base glyphs is assigned a negative weighting factor. Extrapolation may generate elements with undesirable features, but it provides a greater variety of potential final shapes.

Once the master characters have been generated, the multiple master typeface may be delivered to a user for use in other applications, e.g., word processing. The user may use the multiple master typeface to generate a myriad of fonts. The user sets the font design variable in step 36 by means of a conventional interactive interface. The font design variable may be converted into a normalized value (w) between 0 and 1.0.

Once the font design variable has been set, an interpolated character 10*c* is generated by calculating new weighting factors for each element. Specifically, the new weighting factors may be a weighted average of the weighting factors from the master fonts. If the hook-shaped element 16*a* of the light character 10*a* has weighting factors $a_1, a_2, a_3 \ldots a_{16}$, and the hook-shaped element 16b of the bold character 10b has weighting factors $b_1, b_2, b_3 \ldots b_{16}$, then new weighting factors $c_1, c_2, c_3 \ldots c_{16}$ are computed for the composite element 16c of the composite character 10c. Specifically, the new weighting factors may be computed by the equation $c_1 = w \cdot a_1 + (1-w)b_1, c_2 = w \cdot a_2 + (1-w)b_2, c_3 = w \cdot a_3 + (1-w)b_3, \ldots, c_{16} = w \cdot a_{16} + (1-w)b_{16}$. The new weighting factors $c_1, c_2, c_3 \ldots c_{16}$ are then used in the image interpolation in step 30. Finally, the composite character 10c is displayed in step 34. Of course, interpolation between more than two masters may be performed.

The program provides the possibility of faster and easier generation of new master fonts. For example, all of the base glyphs in the glyph sets may be associated into pairs of heavy and light glyphs. In order to generate a master having a heavier weight, the font designer may merely copy the same weighting value which represents the weight property of the element to every character in the master font. This will provide a "rough draft" of the font. Then the font designer may "fine tune" the font by manipulating individual elements in individual characters in order to provide a more esthetically pleasing typeface.

In addition, the program may permit a user to develop entirely new characters. For example, a user may create each element of a new character by selecting a shape from a menu or _palette, dragging it into position, and assigning weighting factors for each base glyph in the glyph set for that shape. The new character would then be added to the master font. Thus, the program may be used as an end-user tool for the development of gaiji characters, such as corporate logos or stylized forms of standard kanji characters. In order to simplify the process of development of new characters, the weighting factors of the elements in the new characters shapes may be automatically derived from the weighting factors of existing characters in the font, and the user may be prohibited from modifying the weighting factors. Alternately, the user may be given access to only a small number of shapes.

Figure 7:
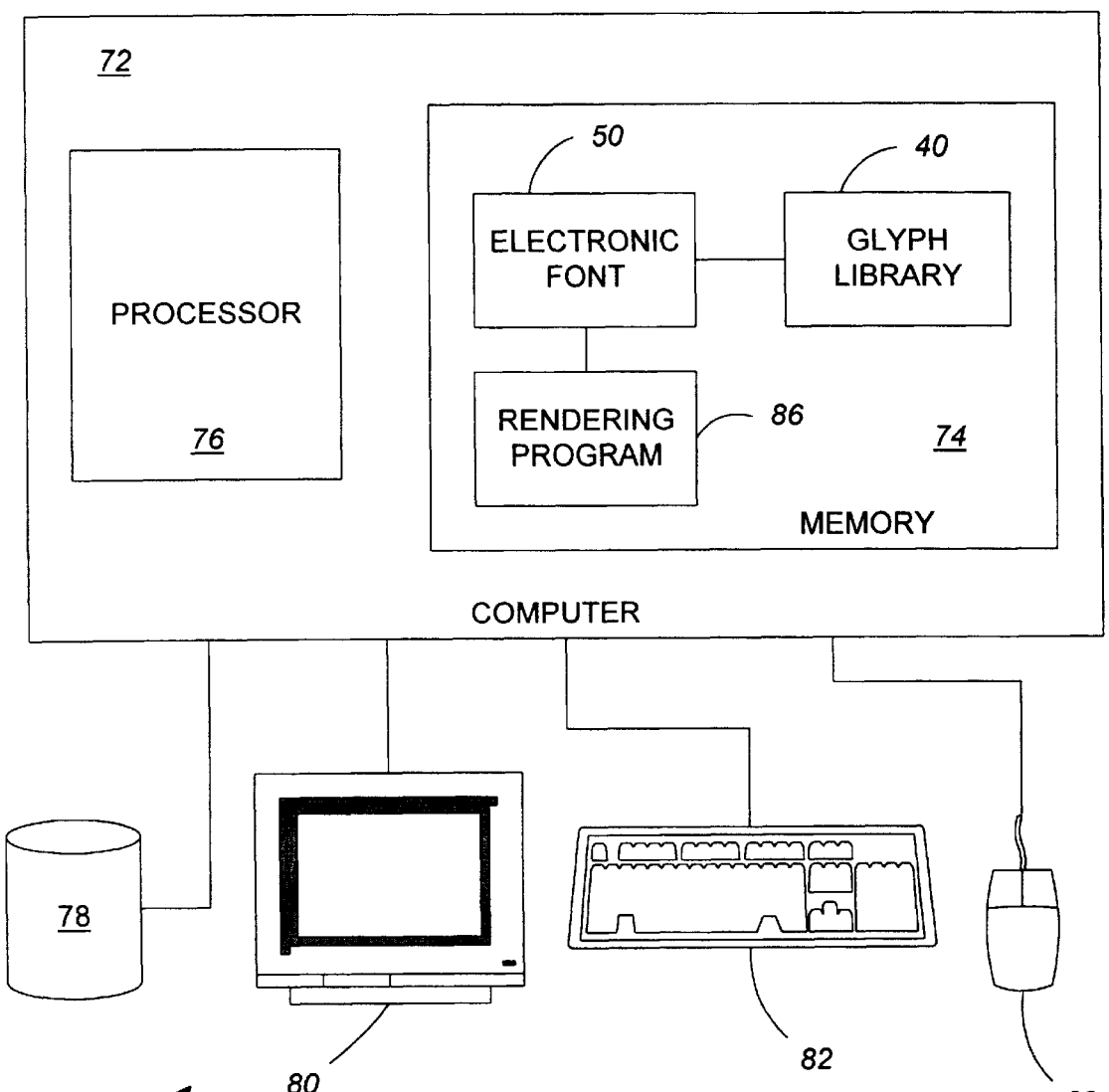
FIG. 7 is a schematic diagram of a computer system which may be used to carry out the present invention.

Referring to FIG. 7, the method of the present invention may be implemented with a memory 74 and a microprocessor 76. The memory and microprocessor may be components of a general-purpose computer 72 of conventional construction in a computer system 70. The computer system 70 may also include a mass storage device 78, an output device 80, such as a display screen, laser printer print engine, photo typesetter, or laser film recorder, and an input-device 82, such as a keyboard or mouse. The microprocessor 76 is controlled by a font rendering program 86 stored in memory 74. The font rendering program 86 has access to the typeface 50 and the glyph library 40. The typeface 50 is stored in a machine readable format including a set of instructions that may be executed by the program to render characters on the output device 80. Alternately, the processor and memory may be embedded in a peripheral device, such as a PostScript® laser printer.

The methods described may be implemented in hardware, firmware, software, or combinations thereof, or in a computer program product tangibly embodied in a computer readable storage device. Storage devices suitable for tangibly embodying the computer program include all forms of non-volatile memory, including semiconductor memory devices, magnetic disks, magneto-optical disks, and optical disks.

What is claimed is:

1. A method of displaying a master of a digital font character, comprising:

identifying a shape type and a position for each element in a character;

providing a glyph set for each shape type, each glyph set containing a plurality of different base glyphs;

for each element in the character, determining a weighting factor for each base glyph in the glyph set for the shape type of that element;

for each element in the character, creating a composite element from the base glyphs in the glyph set for the shape type of that element, a relative contribution of each base glyph to the composite element determined by the weighting factors determined for that element and that base glyph; and placing the composite elements in the identified positions to display a master of the character.

2. The method of claim 1, wherein creating a composite element includes interpolation between the base glyphs in the glyph set based upon the weighting factors.

3. The method of claim 1, wherein creating a composite element includes extrapolation from the base glyphs in the glyph set based upon the weighting factors.

4. The method of claim 1, wherein at least one weighting factor is derived from a weighting value which is assigned to a subset of the base glyphs in the glyph set.

5. The method of claim 1, wherein a plurality of weighting factors are derived from at least one design axis variable.

6. The method of claim 1 wherein the character is a kanji character.

7. A method of defining a master of a digital font, comprising:

a) identifying a shape type and a position for each element in a character;

b) providing a glyph set for each shape type, each glyph set containing a plurality of different base glyphs;

c) for each element in the character, determining at least one weighting factor which represents the relative contribution to a composite element of at least one of the base glyphs in the glyph set for the shape type of that element;

d) storing the shape type, position, and weighting factor for each element of the character in a non-volatile storage; and e) iterating steps (a) through (d) for each character in the master font.

8. The method of claim 7, further comprising iterating steps (a) through (e) for each master font in a multiple master typeface.

9. The method of claim 7, wherein a weighting factor is determined for each base glyph in the glyph set for each element.

10. The method of claim 7, wherein the weighting factor represents the relative contribution of two or more of the base glyphs to the composite element.

11. A method of generating an instance of a digital font character, comprising:

for each element of a first master character, generating a first composite element from a first plurality of base glyphs;

for each element of a second master character, generating a second composite element from a second plurality of base glyphs; and combining the first and second master characters to generate the instance of the character.

12. The method of claim 11, wherein for each element, the first and second pluralities of base glyphs are selected from the same glyph set.

13. The method of claim 12, wherein generating each first composite element includes defining a first plurality of weighting factors for each base glyph in the glyph set, and generating each second composite element includes defining a second plurality of weighting factors for each base glyph in the glyph set.

14. The method of claim 13, wherein creating the composite element includes calculating a new weighting factor for each base glyph in the glyph set from the weighting factors for that base glyph from the first and second pluralities of weighting factors.

15. A method of generating a digital font character, comprising:
identifying a shape type and a position for each element in the character;
providing a glyph set For each shape type, each glyph set containing a plurality of different base glyphs;
for each element in the character, receiving a first weighting factor for each base glyph in the glyph set for the shape type of that element;
for each element in the character, receiving a second weighting factor for each base glyph in the glyph set for the shape type of that element;
for each element in the character, determining a third weighting factor for each base glyph in the glyph set for the shape type of that element, the third weighting factor computed from the first and second weighting factors;
for each element in the character, creating a composite element from the base glyphs in the glyph set for the shape type of that element, the relative contribution of each base glyph to the composite element determined by the third weighting factor determined for that element; and
placing the composite elements in the identified positions to display the master of the character.

16. The method of claim 15, wherein the third weighting factor is a weighted average of the first and second weighting factors.

17. The method of claim 16, wherein the weighted average is determined by a font design variable.

18. The method of claim 14, wherein the new weighting factor is calculated for each base glyph in the glyph set is computed from the first and second weighting factor for that base glyph.

19. The method of claim 1, further comprising selecting a plurality of glyphs from one of the glyph sets to form a glyph subset.

20. The method of claim 19, further comprising assigning a weighing value to the glyph subset.

21. A method of displaying a master of a digital font character, comprising:
identifying a shape type and a position for each element in the character;
providing a glyph set for each shape type, each glyph set containing a plurality of different base glyphs;
for each element in the character, determining a weighting actor for each base glyph in the glyph set for the shape type of that element, the weighting factors for each element in the character being independent of the weighting factors for other elements in the character;
for each element in the character, creating a composite element from the base glyphs in the glyph set for the shape type of that element, a relative contribution of each base glyph to the composite element determined by the weighting factors determined for that element and that base glyph; and
placing the composite elements in the identified positions to display the master of the character.

22. A method of displaying a master of a digital font character, comprising:
identifying a shape type and a position for each element in the character;
providing a glyph set for each shape type, each glyph set containing a plurality of different base glyphs, wherein at least some of the glyph sets includes base glyphs for shape types that are less than a whole characters;
for each element in the character, determining a weighting factor for each base glyph in the glyph set for the shape type of that element;
for each element in the character, creating a composite element from the base glyphs in the glyph set for the shape type of that element, a relative contribution of each base glyph to the composite element determined by the weighting factors determined for that element and that base glyph; and
placing the composite elements in the identified positions to display the master of the character.

23. A method of designing a glyph representing an appearance of a character, the method comprising:
displaying a set of glyph elements, each glyph element having two or more base glyphs that represent different appearances of the glyph element;
receiving a first user input selecting one or more glyph elements from the set and, furthermore, specifying relative positions of the one or more glyph elements selected;
for at least one of the glyph elements selected, receiving a second user input that specifies at least one weighting factor that specifies contributions of the base glyphs of the glyph element to a user-selected appearance of the glyph element; and
displaying a composite glyph in accordance with the first and second user input, the composite glyph representing a user-selected appearance of a character.

24. A method of designing a glyph representing an appearance of a character, the method comprising:
displaying a set of glyph elements, each glyph element having two or more base glyphs that represent different appearances of the glyph element;
receiving a fist user input selecting one or more glyph elements from the set and, furthermore, specifying relative positions of the one or more glyph elements selected;
for at least one of the glyph elements selected, receiving a second user input that specifies at least one weighting factor that specifies the contribution of each base glyphs of the glyph element to a user-selected appearance of the glyph element;
defining a composite glyph in accordance with the first and second user input, the composite glyph representing a first user-selected appearance of a character;
receiving a third user input that includes at least one weighting factor that specifies the contribution of the composite glyph to a second user-selected appearance of the character; and
defining a new composite glyph that represents the second user-selected appearance of the character, the second user-selected appearance being based on the weighting factor specified by the third user input.

25. A computer program product, tangibly stored on machine-readable medium, for displaying a master of a digital font character, the product comprising instructions to cause a processor to:

identify a shape type and a position for each element in a character;

provide a glyph set for each shape type, each glyph set containing a plurality of different base glyphs;

for each element in the character, determine a weighting factor for each base glyph in the glyph set for the shape type of that element;

for each element in the character, create a composite element from the base glyphs in the glyph set for the shape type of that element, a relative contribution of each base glyph to the composite element determined by the weighting factors determined for that element and that base glyph; and place the composite elements in the identified positions to display a master of the character.

26. The product of claim 25, wherein instructions to create a composite element include instructions to interpolate between the base glyphs in the glyph set based upon the weighting factors.

27. The product of claim 25, wherein instructions to create a composite element include instructions to extrapolate from the base glyphs in the glyph set based upon the weighting factors.

28. The product of claim 25, wherein at least one weighting factor is derived from a weighting value which is assigned to a subset of the base glyphs in the glyph set.

29. The product of claim 25, further comprising instructions to derive, from at least one design axis variable, a plurality of weighting factors.

30. The product of claim 25 wherein the character is a kanji character.

31. A computer program product, tangibly stored on machine-readable medium, for generating an instance of a digital font character, the product comprising instructions to cause a processor to:

for each element of a first master character, generate a first composite element from a first plurality of base glyphs;

for each element of a second master character, generate a second composite element from a second plurality of base glyphs; and combine the first and second master characters to generate the instance of the character.

32. The product of claim 31, further comprising instructions to select, for each element and from the same glyph set, the first and second pluralities of base glyphs.

33. The product of claim 32, wherein instructions to generate each first composite element include instructions to define a first plurality of weighting factors for each base glyph in the glyph set, and instructions to generate each second composite element include instructions to define a second plurality of weighting factors for each base glyph in the glyph set.

34. The product of claim 33, wherein instructions to create the composite element include instructions to calculate a new weighting factor for each base glyph in the glyph set from the weighting factors for that base glyph from the first and second pluralities of weighting factors.

35. A computer program product, tangibly stored on machine-readable medium, for designing a glyph representing an appearance of a character, the product comprising instructions to cause a processor to:

display a set of glyph elements, each glyph element having two or more base glyphs that represent different appearances of the glyph element;

receive a first user input selecting one or more glyph elements from the set and, furthermore, specify relative positions of the one or more glyph elements selected;

for at least one of the glyph elements selected, receive a second user input that specifies at least one weighting factor that specifies contributions of the base glyphs of the glyph element to a user-selected appearance of the glyph element; and display a composite glyph in accordance with the first and second user input, the composite glyph representing a user-selected appearance of a character.

36. A computer program product, tangibly stored on machine-readable medium, for designing a glyph representing an appearance of a character, the product comprising instructions to cause a processor to:

display a set of glyph elements, each glyph element having two or more base glyphs that represent different appearances of the glyph element;

receive a first user input selecting one or more glyph elements from the set and, furthermore, specify relative positions of the one or more glyph elements selected;

for at least one of the glyph elements selected, receive a second user input that specifies at least one weighting factor that specifies the contribution of each base glyphs of the glyph element to a user-selected appearance of the glyph element;

define a composite glyph in accordance with the first and second user input, the composite glyph representing a first user-selected appearance of a character;

receive a third user input that includes at least one weighting factor that specifies the contribution of the composite glyph to a second user-selected appearance of the character; and define a new composite glyph that represents the second user-selected appearance of the character, the second user-selected appearance being based on the weighting factor specified by the third user input.

* * * * *

UNITED STATES PATENT AND TRADEMARK OFFICE
CERTIFICATE OF CORRECTION

PATENT NO.   : 6,952,210 B1
DATED        : October 4, 2005
INVENTOR(S)  : John S. Renner and Jonathan A. Von Zelowitz It is certified that error appears in the above-identified patent and that said Letters Patent is hereby corrected as shown below:

Column 9,
Line 14, delete "For" and replace with -- for --;
Line 56, delete "actor" and replace with -- factor --;

Column 10,
Line 44, delete "fist" and replace with -- first --.

Signed and Sealed this

Seventeenth Day of January, 2006

JON W. DUDAS
*Director of the United States Patent and Trademark Office*